US011495991B1

(12) United States Patent
    Alt (10) Patent No.: US 11,495,991 B1
(45) Date of Patent: Nov. 8, 2022

(54) VEHICLE BACKUP POWER SUPPLY

(71) Applicant: DUS Operating Inc., Auburn Hills, MI (US)

(72) Inventor: McKenzie Russell Alt, Sterling Heights, MI (US)

(73) Assignee: DUS OPERATING INC., Auburn Hills, MI (US)

( * ) Notice: Subject to any disclaimer, the term of this patent is extended or adjusted under 35 U.S.C. 154(b) by 0 days.

(21) Appl. No.: 17/345,573

(22) Filed: Jun. 11, 2021

(51) Int. Cl.
    *H02J 7/34*    (2006.01)
    *H02J 7/00*    (2006.01)
    *B60R 16/03*   (2006.01)

(52) U.S. Cl.
    CPC .............. *H02J 7/345* (2013.01); *B60R 16/03* (2013.01); *H02J 7/007182* (2020.01)

(58) Field of Classification Search
    CPC ...... H02J 7/345; H02J 7/007182; B60R 16/03
    USPC ........................................................ 307/10.1
    See application file for complete search history.

(56) References Cited

U.S. PATENT DOCUMENTS

| 5,982,050 A     | * 11/1999 | Matsui   | H02J 7/0016  |
|                 |           |          | 340/636.15   |
| 2015/0102780 A1 | * 4/2015  | Bauer    | H02J 7/007   |
|                 |           |          | 320/166      |
| 2021/0146924 A1 | * 5/2021  | Miyata   | B60W 30/143  |
| 2022/0123585 A1 | * 4/2022  | Kageyama | F16H 63/40   |

OTHER PUBLICATIONS

International Searching Authority. International Search Report and Written Opinion for PCT Application No. PCT/US2022/032626, dated Jul. 11, 2022, pp. 1-8.

\* cited by examiner

*Primary Examiner* — Michael R. Fin
(74) *Attorney, Agent, or Firm* — Vivacqua Crane PLLC (57) ABSTRACT

A vehicle control system is provided that includes a storage module including a capacitor module configured to store electrical energy and a storage controller operatively connected to the capacitor module. The storage controller is configured to provide the capacitor module electrical energy when the stored electrical energy of the capacitor module is less than a stored electrical energy threshold. The vehicle control system also includes a computer operatively connected to the storage controller, wherein the computer is configured to determine when a supplied voltage is less than a voltage threshold and initiate a shift-by-wire actuator when the supplied voltage is less than voltage threshold using the stored electrical energy in the capacitor module to actuate the shift-by-wire actuator.

18 Claims, 4 Drawing Sheets

FIG. 4

VEHICLE BACKUP POWER SUPPLY

FIELD

The disclosure relates generally to a vehicle backup power supply, and more particularly to a vehicle control system that includes a backup power supply that can provide backup power to actuate a transmission shift-by-wire actuator.

BACKGROUND

The statements in this section merely provide background information related to the present disclosure and may or may not constitute prior art.

Generally, vehicles having an automatic transmission or electric vehicles that do not have a gearbox are provided with a park lock function adapted to lock the output shaft of the automatic transmission or the output shaft of the electric motor to restrict the vehicle from moving in any direction. A parking pawl prevents the transmission from rotating, which prevents the vehicle from moving.

SUMMARY

A vehicle control system is provided that includes a storage module including a capacitor module configured to store electrical energy and a storage controller operatively connected to the capacitor module. The storage controller is configured to provide the capacitor module electrical energy when the stored electrical energy of the capacitor module is less than a stored electrical energy threshold. The vehicle control system also includes a computer operatively connected to the storage controller, wherein the computer is configured to determine when a supplied voltage is less than a voltage threshold and initiate a shift-by-wire actuator when the supplied voltage is less than voltage threshold using the stored electrical energy in the capacitor module to actuate the shift-by-wire actuator.

In other aspects, the storage module comprises a plurality of capacitors.

In other aspects, the plurality of capacitors comprise supercapacitors.

In other aspects, the vehicle control system includes active balancing circuitry and passive balancing circuitry, wherein the capacitor module is connected to an output of a buck regulator, wherein the active balancing circuitry and the passive balancing circuitry are connected to the capacitor module.

In other aspects, the active balancing circuitry comprises a plurality of Zener diodes configured to balance a voltage supplied to the capacitor module from the buck converter.

In other aspects, the passive balancing circuitry comprises a plurality of resistors.

In other aspects, the vehicle control system includes an electrical machine.

In other aspects, the electrical machine includes an inverter and a motor.

In other aspects, the motor is configured to create a rotating magnetic field to actuate the shift-by-wire actuator.

In other aspects, the computer is further configured to determine whether a vehicle speed is less than a vehicle speed threshold and whether a vehicle communication status is active, wherein the computer initiates the shift-by-wire actuator when the vehicle speed is less than the vehicle speed threshold and the vehicle communication status is active.

A vehicle is provided that includes a vehicle controls system. The vehicle control system includes a storage module including a capacitor module configured to store electrical energy and a storage controller operatively connected to the capacitor module. The storage controller is configured to provide the capacitor module electrical energy when the stored electrical energy of the capacitor module is less than a stored electrical energy threshold. The vehicle control system also includes a computer operatively connected to the storage controller, wherein the computer is configured to determine when a supplied voltage is less than a voltage threshold and initiate a shift-by-wire actuator when the supplied voltage is less than voltage threshold using the stored electrical energy in the capacitor module to actuate the shift-by-wire actuator.

In other aspects, the storage module comprises a plurality of capacitors.

In other aspects, the plurality of capacitors comprise supercapacitors.

In other aspects, the vehicle control system includes active balancing circuitry and passive balancing circuitry, wherein the capacitor module is connected to an output of a buck regulator, wherein the active balancing circuitry and the passive balancing circuitry are connected to the capacitor module.

In other aspects, the active balancing circuitry comprises a plurality of Zener diodes configured to balance a voltage supplied to the capacitor module from the buck converter.

In other aspects, the passive balancing circuitry comprises a plurality of resistors.

In other aspects, the vehicle control system includes an electrical machine.

In other aspects, the electrical machine includes an inverter and a motor.

In other aspects, the motor is configured to create a rotating magnetic field to actuate the shift-by-wire actuator.

In other aspects, the computer is further configured to determine whether a vehicle speed is less than a vehicle speed threshold and whether a vehicle communication status is active, wherein the computer initiates the shift-by-wire actuator when the vehicle speed is less than the vehicle speed threshold and the vehicle communication status is active.

Further aspects, examples, and advantages will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of the disclosure. Moreover, in the figures, like reference numerals designate corresponding parts throughout the views.

DETAILED DESCRIPTION

The following description is merely exemplary in nature and is not intended to limit the present disclosure, application or uses.

Figure 1:
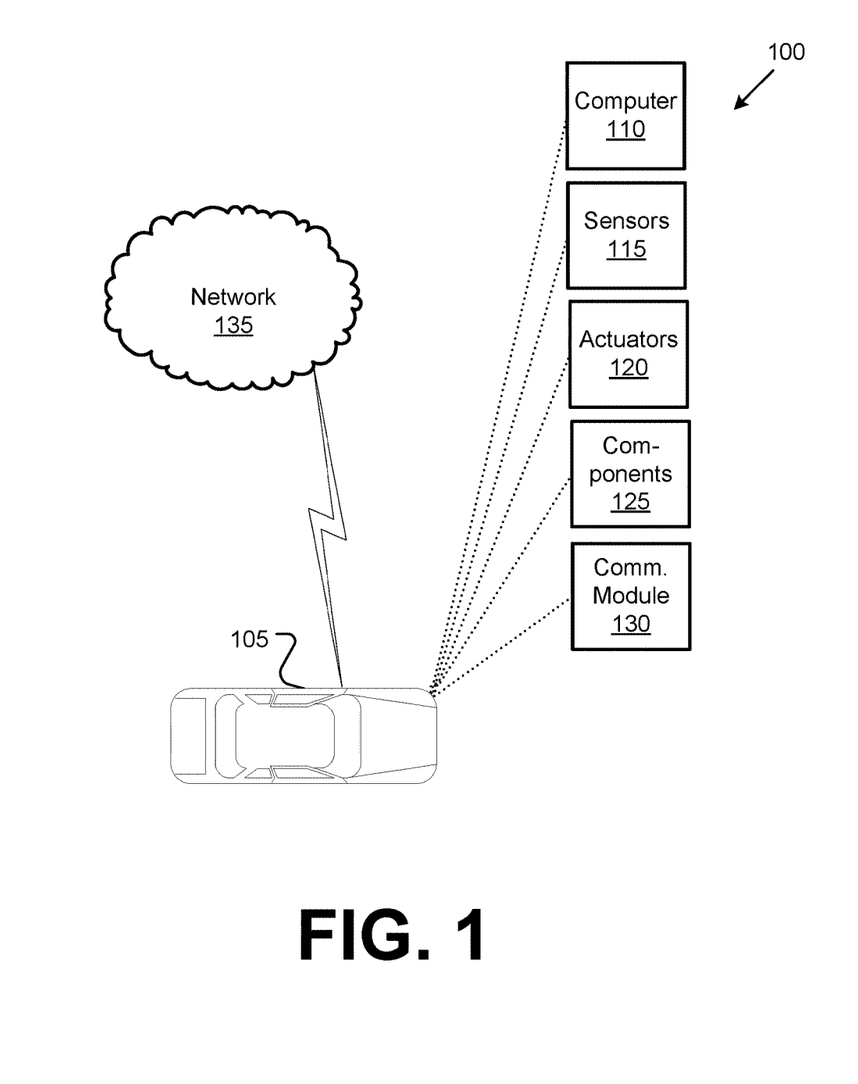
FIG. 1 is a schematic diagram of an exemplary motor vehicle having a vehicle control system according to the principles of the present disclosure.

FIG. 1 is a block diagram of an example vehicle system 100. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a network 135, the communications module 130 allows the computer 110 to communicate with a server or other vehicles.

The computer 110 includes a processor and a memory. The memory includes one or more forms of computer readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include camera sensor(s) 115, e.g., front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle to vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

Figure 2:
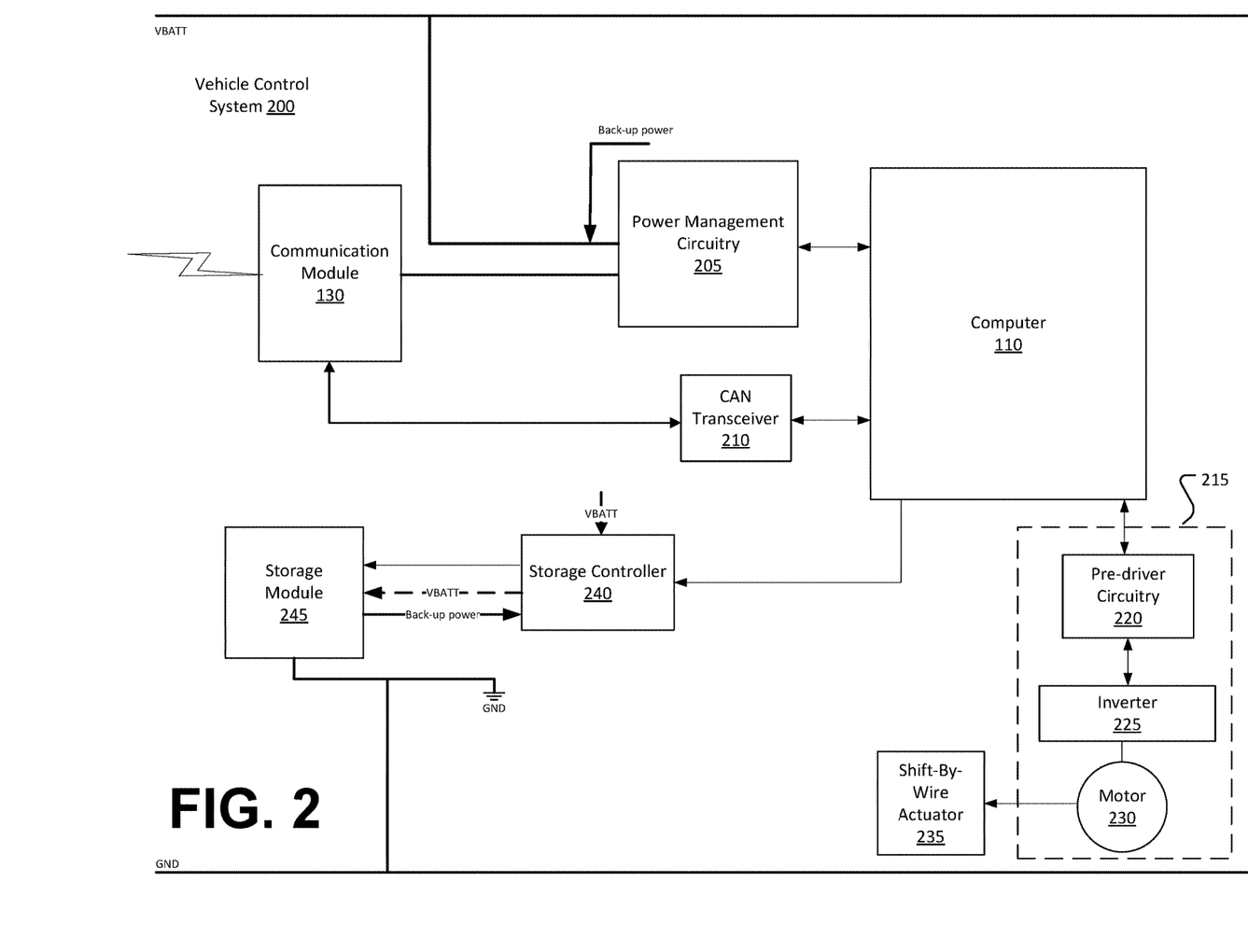
FIG. 2 is a block diagram of the vehicle control system.

FIG. 2 illustrates an example vehicle control system 200 according to an example implementation of the present disclosure. As shown, the vehicle control system 200 includes the computer 110, power management circuitry 205, the communication module 130, and a control area network (CAN) transceiver 210. While not illustrated, it is understood that the vehicle control system 200 may also include suitable circuit protection devices to mitigate electrical damage.

The vehicle control system 200 can be at least partially powered by a vehicle 105 battery (VBATT). As shown, the power management circuitry 205 can be connected to VBATT, and the power management circuitry 205 can control the flow and direction of the electrical power provided by VBATT. In some implementations, the power management circuitry 205 provides voltage regulation and/or charging functionality to the vehicle control system 200. For example, the power management circuitry 205 may comprise a DC/DC converter in some implementations.

In an example implementation, the vehicle 105 battery can comprise an onboard rechargeable energy storage system (RESS) that may include one or more high-voltage, independently rechargeable battery packs adapted for storing high-voltage electrical energy used for propelling an electric-drive vehicle. The RESS may be a deep-cycle, high-ampere capacity battery system rated for approximately four hundred (400) to approximately eight hundred (800) volts direct current (VDC) or more, for example, depending on a desired vehicle range, gross vehicle weight, and power ratings of the various loads drawing electrical power from the RESS.

The computer 110 can transmit and receive communication data to or from the communication module 130 via the CAN transceiver 210. The CAN transceiver 210 can convert data from one data type to another data type. For example, the CAN transceiver 210 can convert single-ended data provided by the computer 110 to a differential signal that is provided to the communication module, or vice versa.

The vehicle control system 200 can also include an electric machine 215 that is configured to propel the vehicle 105. For example, the electric machine 215 is rotatably connected to an input shaft of the vehicle 105 transmission. The output shaft of the transmission can be connected to a differential that drives wheels via an axle that is connected to the differential. The differential transmits approximately equal torque to each wheel while permitting slight speed differences such as when the vehicle turns a corner. Different types of differentials or similar devices may be used to distribute torque from the powertrain to one or more wheels.

As shown, the electric machine 215 can include pre-driver circuitry 220, an inverter 225, and a motor 230, such as an electric motor. The computer 110 is operatively connected to the electric machine 215 such that the controller 110 can issue control signals to the electric machine 215 based on one or more torque request signals. The pre-driver circuitry 220 is configured to control the drive of the inverter 225. In an example implementation, the computer 110 can issue an enable signal to the pre-driver circuitry 220 to enable operation of the pre-driver circuitry 220. The pre-driver circuitry 220 can also receive pulse-width-modulated signals from the computer 110 and provides the pre-driver circuitry 220 that can be provided to various switching gates within the inverter 225.

The inverter 225 govern the transmission of electrical energy to and from the motor 230. In an example implementation, the inverter 225 can include a set of semiconductor switches (also referred to herein as "inverter switches") that cooperatively convert direct current (DC) power from the vehicle 105 battery to alternating current (AC) power for powering the motor 230 via high frequency switching during vehicle operation. Each semiconductor switch may be embodied as a voltage-controlled switching device in the form of a silicon insulated gate bipolar transistor (IGBT), a silicon carbide (SiC) metal-oxide semiconductor field effect transistor (MOSFET), a silicon (Si) superjunction MOSFET, a Gallium nitride (GaN) field-effect transistor (FET), a SiC junction-gate field-effect transistor (JFET), other wideband-gap (WBG) or ultra-wideband-gap semiconductor power switching device (UWBG), or other suitable switch having a corresponding gate to which a gate signal is applied to change the on/off state of a given switch.

The motor 230 can include machine windings that provide three-phase current to create a rotating magnetic field to actuate an actuator 235. In an example implementation, the actuator 235 comprises a shift-by-wire actuator. For example, the shift-by-wire actuator can comprise a park lock actuator that operates a pawl that blocks or releases a park lock gear within the transmission component. In another example, the shift-by-wire actuator comprises a PRND actuator.

The vehicle control system 200 also includes a storage controller 240 and a storage module 245. The computer 110 is operatively connected to the storage controller 240 and can issue an enable signal to the storage controller 240 to initiate operation of the storage controller 240. The storage controller 240 is operatively connected to the storage module 245 is configured to charge and maintain the electrical power stored by the storage module 245.

The storage controller 240 can determine a power status, i.e., a charge level, of the vehicle control system 200 and/or the storage module 245. For example, the storage controller 240 can receive a charge level signal indicative of the charge level of the vehicle 105 battery from the computer 110. The storage controller 240 can also query the storage module 245 to determine a charge level of the storage module 245.

Figure 3:
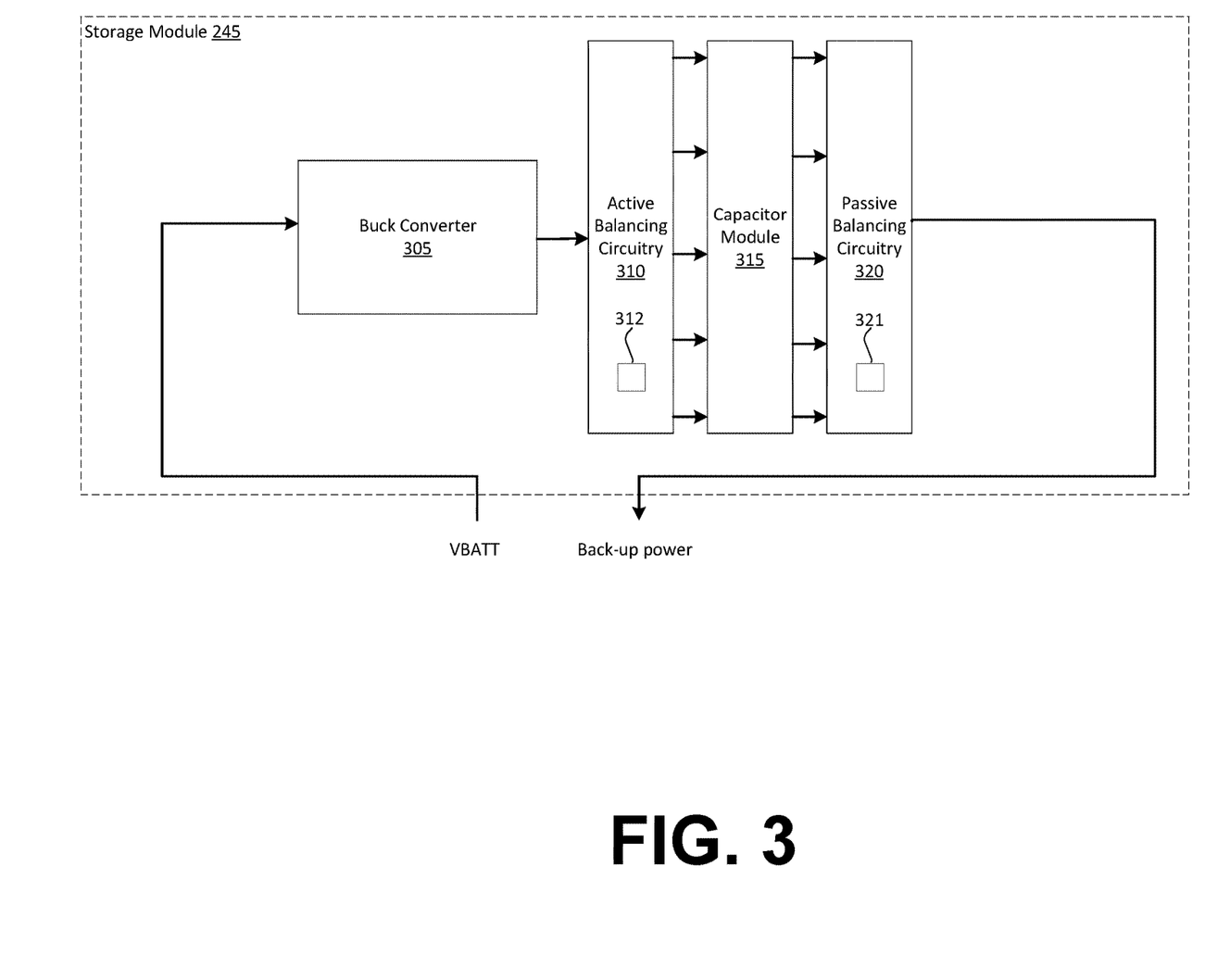
FIG. 3 is a block diagram of an example storage module that is configured to store electrical energy and function as a backup power supply.

FIG. 3 illustrates an example implementation of the storage module 245. The storage module 245 is configured to store electrical energy and to provide the stored energy to one or more components of the vehicle control system 200 when the vehicle 105 battery voltage is less than a voltage threshold, as discussed in greater detail below. As shown, the storage module 245 can include a buck converter 305, active balancing circuitry 310, a capacitor module 315, and passive balancing circuitry 320.

During a charging operation, electrical energy, referred to as VBATT, is transferred from the vehicle 105 battery to the buck converter 305. For example, the storage controller 240 can determine whether the storage module 245 requires additional electrical energy for storage by comparing a stored voltage value with a stored voltage threshold. If the stored voltage value of the storage module 245 is less than the stored voltage threshold, the storage controller 240 provides voltage, e.g., VBATT, to the storage module 245.

It is understood that VBATT may be suitable regulated prior to the charging of the storage module 245. The buck converter 305 comprises DC-to-DC power converter circuitry that converts the voltage VBATT to a lower voltage, and the converted voltage is input to the active balancing circuitry 310. The active balancing circuitry 310 may comprise one or more Zener diodes in an example implementation. The active balancing circuitry 310 equalizes voltage provided to the capacitor module 315.

The capacitor module 315 can comprise multiple capacitors that can be arranged in series and/or in parallel. In an example implementation, the capacitors comprise supercapacitors. The capacitors store electrical energy that can be used to power one or more components of the vehicle control system 200 in the event of power loss. For example, if the vehicle 105 battery can no longer supply sufficient electrical energy, the capacitor module 315 can provide back-up power.

The stored electrical energy from the capacitor module 315 is output to the passive balancing circuitry 320. The passive balancing circuitry 320 can comprise one or more resistors or resistive elements 321. The passive balancing circuitry 320 serves to balance the voltage output from the capacitor module 315. The balanced voltage can serve as a back-up power source if the vehicle 105 battery can no longer supply sufficient electrical energy.

In various implementations, the capacitor module 315 components can be mounted on a substrate, such as a printed circuit board (PCB), that is distinct from the components of the vehicle control system 200. If the voltage (VBATT) provided by the vehicle 105 battery is less than the voltage threshold, the storage module 245 supplies the stored electrical energy as a back-up power supply to allow the computer 110 to determine a vehicle action to undertake. In an example implementation, the computer 110 can initiate actuation of the parking lock actuator 235 based on one or more vehicle parameters, such as vehicle speed, i.e., last known vehicle speed, vehicle communication status, i.e., vehicle components can still communicate with one another, or the like. In some implementations, the vehicle action may comprise no action, i.e., do not initiate the shift-by-wire actuator.

As shown in FIG. 2, back-up power can be provided to the power management circuitry 205 for distribution to the computer 110. Based on the comparison, the computer 110 can determine that the shift-by-wire actuator is to be engaged.

Figure 4:
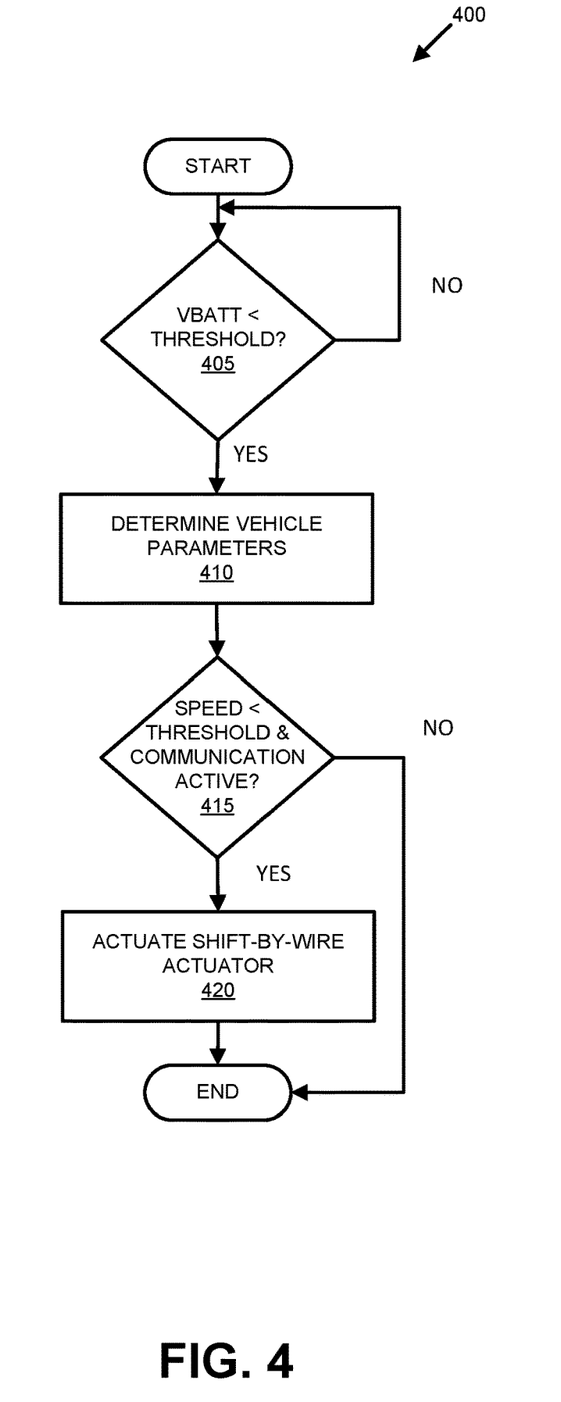
FIG. 4 is a flow chart depicting a process for initiating a park operation when voltage provided by a vehicle battery is less than voltage threshold.

FIG. 4 is a flowchart of an example process 400 for determining whether to actuate a shift-by-wire actuator when voltage provided by the vehicle 105 battery is less than voltage threshold. Blocks of the process 400 can be executed by the computer 110. The process 400 begins at block 405 in which a determination is made whether the voltage (VBATT) provided by the vehicle 105 battery is less than the voltage threshold. The voltage threshold may comprise a voltage value indicative of an amount of voltage required to operate the vehicle control system 200 and/or other components of the vehicle 105.

If the VBATT value is greater than or equal to the voltage threshold, the process 400 returns to block 405. Otherwise, the computer 110 determines one or more vehicle parameters at block 410. For example, the computer 110 can determine a vehicle speed via one or more vehicle sensors 115 and/or a vehicle communication status via the one or more vehicle sensors 115. At block 415, a determination is made whether the vehicle speed is less a vehicle speed threshold and whether the vehicle communication status is active. If the vehicle speed is greater than or equal to the vehicle speed threshold or the vehicle communication status is inactive, the process 400 ends.

Otherwise, the computer initiates a fail-safe mode at block 420 to actuate the shift-by-wire actuator 235 from a non-engaged state to an engaged state. For example, when the computer 110 causes the vehicle 105 to enter a fail-safe mode, the computer 110 may actuate the shift-by-wire actuator 235 such that a pawl of the shift-by-wire actuator blocks the park lock gear. The process 400 then ends.

In general, the computing systems and/or devices described may employ any of a number of computer operating systems, including, but by no means limited to, versions and/or varieties of the OnStar® application, Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A vehicle control system comprising:
   a storage module including a capacitor module configured to store electrical energy;
   a storage controller operatively connected to the capacitor module, the storage controller configured to determine a charge level of the storage module to provide the capacitor module electrical energy when the stored electrical energy of the capacitor module is less than a stored electrical energy threshold, the capacitor module being connected to an output of a buck regulator;
   an active balancing circuitry and a passive balancing circuitry, the active balancing circuitry being connected to an input of capacitor module and the passive balancing circuitry being connected to an output of the capacitor module; and
   a computer operatively connected to the storage controller, wherein the computer is configured to determine when a supplied voltage is less than a voltage threshold and initiate a shift-by-wire actuator when the supplied voltage is less than voltage threshold using the stored electrical energy in the capacitor module to actuate the shift-by-wire actuator.

2. The vehicle control system as recited in claim 1, wherein the storage module comprises a plurality of capacitors.

3. The vehicle control system as recited in claim 2, wherein the plurality of capacitors comprise supercapacitors.

4. The vehicle control system as recited in claim 1, wherein the active balancing circuitry comprises a plurality of Zener diodes configured to balance a voltage supplied to the capacitor module from the buck converter.

5. The vehicle control system as recited in claim 1, wherein the passive balancing circuitry comprises a plurality of resistors.

6. The vehicle control system as recited in claim 1, further comprising an electrical machine.

7. The vehicle control system as recited in claim 6, wherein the electrical machine includes an inverter and a motor.

8. The vehicle control system as recited in claim 7, wherein the motor is configured to create a rotating magnetic field to actuate the shift-by-wire actuator.

9. The vehicle control system as recited in claim 1, wherein the computer is further configured to determine whether a vehicle speed is less than a vehicle speed threshold and whether a vehicle communication status is active, wherein the computer initiates the shift-by-wire actuator when the vehicle speed is less than the vehicle speed threshold and the vehicle communication status is active.

10. A vehicle comprising:
    a vehicle control system, the vehicle control system comprising:
    a storage module including a capacitor module configured to store electrical energy;
    a storage controller operatively connected to the capacitor module, the storage controller configured to determine a charge level of the storage module to provide the capacitor module electrical energy when the stored electrical energy of the capacitor module is less than a stored electrical energy threshold, the capacitor module being connected to an output of a buck regulator;
    an active balancing circuitry and a passive balancing circuitry, the active balancing circuitry being connected to an input of capacitor module and the passive balancing circuitry being connected to an output of the capacitor module; and
    a computer operatively connected to the storage controller, wherein the computer is configured to determine when a supplied voltage is less than a voltage threshold and initiate a shift-by-wire actuator when the supplied voltage is less than voltage threshold using the stored electrical energy in the capacitor module to actuate the shift-by-wire actuator.

11. The vehicle as recited in claim 10, wherein the storage module comprises a plurality of capacitors.

12. The vehicle as recited in claim 11, wherein the plurality of capacitors comprise supercapacitors.

13. The vehicle as recited in claim 10, wherein the active balancing circuitry comprises a plurality of Zener diodes configured to balance a voltage supplied to the capacitor module from the buck converter.

14. The vehicle as recited in claim 10, wherein the passive balancing circuitry comprises a plurality of resistors.

15. The vehicle as recited in claim 10, further comprising an electrical machine.

16. The vehicle as recited in claim 15, wherein the electrical machine includes an inverter and a motor.

17. The vehicle as recited in claim 16, wherein the motor is configured to create a rotating magnetic field to actuate the shift-by-wire actuator.

18. The vehicle as recited in claim 10, wherein the computer is further configured to determine whether a vehicle speed is less than a vehicle speed threshold and whether a vehicle communication status is active, wherein the computer initiates the shift-by-wire actuator when the vehicle speed is less than the vehicle speed threshold and the vehicle communication status is active.

* * * * *